(12) United States Patent
Cmielowski et al.

(10) Patent No.: US 12,443,676 B2
(45) Date of Patent: Oct. 14, 2025

(54) CONTROLLING A BIAS OF A MACHINE LEARNING MODULE BACKGROUND

(71) Applicant: INTERNATIONAL BUSINESS MACHINES CORPORATION, Armonk, NY (US)

(72) Inventors: Lukasz G. Cmielowski, Cracow (PL); Szymon Kucharczyk, Cracow (PL); Dorota Łączak, Mielec (PL); Daniel Jakub Ryszka, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 17/450,694

(22) Filed: Oct. 13, 2021

(65) Prior Publication Data
US 2023/0115067 A1 Apr. 13, 2023

(51) Int. Cl.
*G06N 20/00* (2019.01)
*G06F 18/211* (2023.01)
*G06F 18/2113* (2023.01)
*G06F 18/214* (2023.01)
*G06F 18/40* (2023.01)
*G06N 3/08* (2023.01)

(52) U.S. Cl.
CPC ............ *G06F 18/211* (2023.01); *G06F 18/40* (2023.01); *G06N 20/00* (2019.01)

(58) Field of Classification Search
CPC ........ G06F 18/211; G06F 18/40; G06N 20/00
See application file for complete search history.

(56) References Cited

U.S. PATENT DOCUMENTS

2002/0159642 A1* 10/2002 Whitney ................. G06F 18/41
382/225
2020/0320428 A1 10/2020 Chaloulos
(Continued)

FOREIGN PATENT DOCUMENTS

WO WO-2016127218 A1 * 8/2016 ............. G06N 20/00

OTHER PUBLICATIONS

Tang, Jiliang, Salem Alelyani, and Huan Liu. "Feature selection for classification: A review." 2014, Chamlers, pp. 8-18 (Year: 2014).*
(Continued)

*Primary Examiner* — Shahid K Khan
*Assistant Examiner* — Skylar K Vanwormer
(74) *Attorney, Agent, or Firm* — Teddi Maranzano

(57) ABSTRACT

The present disclosure relates to a computer-implemented method for generating a machine learning module (ML-module). The method comprises providing training data comprising a first set of data corresponding to a first feature and a second set of data corresponding to a second feature and generating a further set of data, wherein the further set of data corresponds to a further feature. A first correlation metric as a measure of a correlation between a selected feature of the first and the second feature and the further feature is calculated. Furthermore, a bias metric is determined indicating a strength of a bias of the trained ML-module towards a first subset of values of the further feature or a second subset of values of the further feature if the first correlation metric is greater than a first threshold. If the bias metric satisfies the bias constraint, then the ML-module is released for usage.

10 Claims, 7 Drawing Sheets

(56) References Cited

U.S. PATENT DOCUMENTS

2020/0372304 A1  11/2020  Kenthapadi
2020/0372406 A1  11/2020  Wick
2021/0133870 A1   5/2021  Kamkar

OTHER PUBLICATIONS

Karegowda, Asha Gowda, A.S. Manjunath and M.A. Jayaram, "Comparative Study of Attribute Selection Using Gain Ratio and Correlation Based Feature Selection", 2010, International Journal or Information Technology and Knowledge Management, p. 274 (Year: 2010).*

Park, Jihong, Sumudu Samarakoon, Mehdi Bennis and Merouane Debbah, "Wireless Network Intelligence at the Edge", Nov. 2019, IEEE, p. 2212 (Year: 2019).*

* cited by examiner

CONTROLLING A BIAS OF A MACHINE LEARNING MODULE BACKGROUND

The invention relates in general to the field of machine learning modules and, in particular, to a method for generating a machine learning module.

Machine learning modules are applied in various fields. Generally, machine learning modules are used to calculate an output value dependent on input values, wherein the output value may be considered as a prediction dependent on the input values. Each input value may correspond to a respective input feature of a machine learning module (ML-module). A set of values corresponding to a selected input feature may be divided into subsets. With respect to certain applications of ML-modules, it is desirable that the output value of an exemplary ML-module is not dependent on which of the subsets an input value corresponding to the selected input feature belongs to. In other words, the exemplary ML-module should not be biased towards one of the subsets with respect to the selected feature. The division into the subsets may be performed by a user of the exemplary ML-module.

SUMMARY

Various embodiments provide a computer system for generating a machine learning module (ML-module) and a method as described by the subject matter of the independent claims. Advantageous embodiments are described in the dependent claims. Embodiments of the present invention can be freely combined with each other if they are not mutually exclusive.

In one aspect, the invention relates to a computer-implemented method for generating a machine learning module (ML-module), comprising providing training data comprising at least a first set of data corresponding to a first feature and a second set of data corresponding to a second feature, wherein one feature of the first feature and the second feature is a selected feature and the set of data corresponding to the selected feature is a selected set of data. A further set of data dependent on at least one set of data of the first set of data and the second set of data is generated automatically. A first correlation metric is calculated as a measure of a correlation between the selected feature and the further feature dependent at least on the further set of data and the selected set of data. A check is performed whether the first correlation metric is greater than a first threshold. Training the ML-module is performed dependent on at least the further set of data. At least a first subset of values of the further feature and a second subset of values of the further feature is defined. A bias metric is determined indicating a strength of a bias of the ML-module towards the first subset of values of the further feature or the second subset of values of the further feature if the first correlation metric is greater than the first threshold. Whether the bias metric satisfies a bias constraint is checked. The ML-module is released for usage if the bias metric satisfies the bias constraint.

Embodiments are further directed to computer systems and computer program products having substantially the same features as the above-described computer-implemented method.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
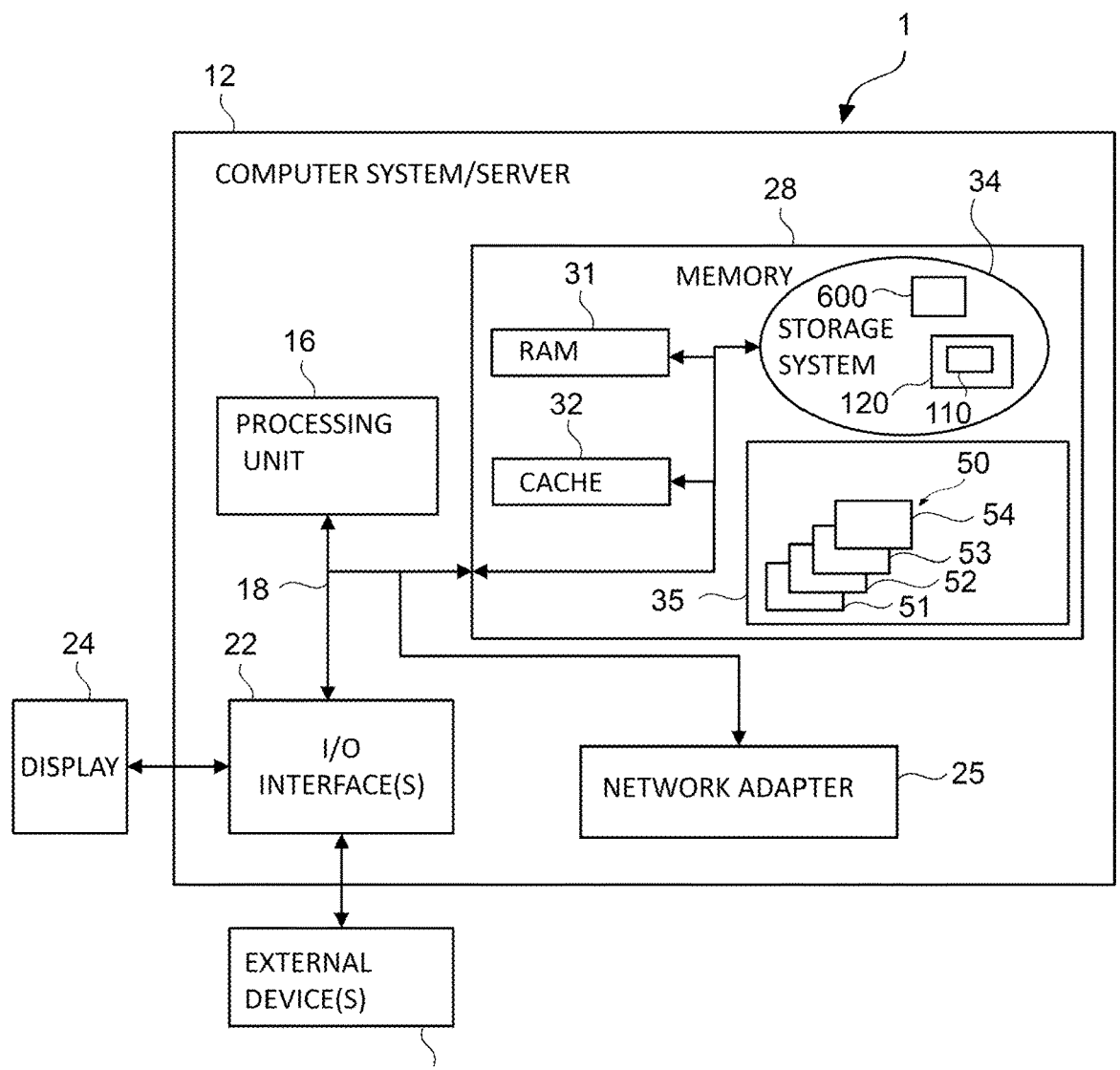
FIG. 1 is a block diagram schematically illustrating a computer system according to an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The first subset of values of the further feature and the second subset of values of the further feature may be disjoint subsets.

The training data may be structured in respective data records, each data record comprising a respective value of the first set of data and a respective value of the second set of data. A respective value of the further set of data may be added to the respective data record. The generating of the further set of data may comprise generating a respective value of the further set of data dependent on the value of the first set of data and/or on the value of the second set of data of the respective data record. The respective value of the further set of data may be added to the respective data record.

The training of the ML-module may comprise computing a respective training output value of an output of the ML-module for each data record by means of the ML-module and dependent on at least the value of the further set of data of the respective data record. Furthermore, the training of the ML-module may comprise modifying values of model parameters of the ML-module dependent on the training output values of the output of the ML-module.

In most cases, each data record may comprise a respective value of a target feature. Each data record may correspond to a respective observable instant or entity. The respective observable instant or entity may be described by means of the respective value of the first set of data and the respective value of the second set of data and/or the respective value of the target feature of the respective data record.

For example, the respective observable instant may be associated with a respective time interval or with a respective point of time in which or at which the respective value of the first set of data and the respective value of the second set of data and/or the respective value of the target feature are written in the respective data record or are captured. In other words, the respective value of the first set of data and the respective value of the second set of data and/or the respective value of the target feature may each correspond to the respective observable instant. The respective time interval or points of time may be each a respective time interval or point of time in which or at which a machine or a communication system is in operation. Thus, the data records may describe a behavior of the machine or the communication system during a course of time comprising the time intervals or the points of time.

For example, the training data may be generated by capturing sensor data of the machine. For example, a first sensor may be arranged in the machine for recording the first set of data and a second sensor may be arranged in the machine for recording the second set of data. Hence, the first set of data may be first sensor values and the second set of data may be second sensor values. The respective value of the target feature may be captured by a further sensor which may be arranged in the machine. A measuring unit may write the respective value of the first set of data, the respective value of the second set of data and the respective value of the target feature in the respective data record.

In another example, the training data may be provided by capturing the first set of data, the second set of data and/or the values of the target feature by means of the communication system. The communication system may comprise one or more communication devices, such as a mobile phone or a desktop computer. The communication devices may be connected via the internet to form the communication system. The values of the first and the second set of data and/or the values of the target feature may be each designed in the form of electronic signals received by the one or more communication devices.

In one example, the respective value of the first and the second feature and/or the target feature of the respective data record may describe each a respective status or respective properties, for example a geolocation or a strength of signal reception, of one of the communication devices at the respective point of time or within the respective time interval corresponding to the respective data record.

According to a further example, the value of the first and the second feature and/or the target feature of the respective data record may each describe a respective status or respective properties of a respective entity, for example the respective communication device of the communication system. In this case, each data record may be associated with one of the respective entities. Thus, the data records as a whole may describe the communication devices with their respective status in one point of time or one time interval. In one example, the properties of the respective entity may comprise an age, gender, height, income, weight, place of birth and/or a profession associated with the respective entity.

In one example, the respective entity, for example the respective communication device, may provide the training data by generating the respective data records. In another example, a logging unit of the communication system may receive the value of the first and the second feature and/or the target feature of the respective entity, for example the respective communication device, and generate the respective data record by writing these respective values in the respective data record.

After performing the training of the ML-module may be in a trained state. The trained ML-module may be applied for calculating a future value of the target feature dependent on at least a future value of the further feature. The future value of the target feature generally may be a value which is used for an application such as controlling the above-mentioned machine or predicting a behavior of one or more of the communication devices. Thus, the future value of the target feature is referred to as application value of the target feature in the following. Analogously, the future value of the further feature is referred to as application value of the further feature in the following.

In one example, the trained ML-module may be considered as a function module designed for mapping the application value of the further feature to the application value of the target feature. In most cases, the trained ML-module may be designed for mapping several application inputs values of the ML-module to an application value of the output of the ML-module. The application value of the output of the ML-module may comprise the application value of the target feature. The application input values may comprise the application value of the further feature. The application value of the further feature may be determined dependent on at least an application value of the first and/or the second feature. The application input values may comprise the application value of the first and/or the second feature. In this case, the first and/or second feature may be a first and second input feature of the trained ML-module respectively. Generally, the further feature may be considered as a further input feature of the ML-module.

Referring to the example according to which the training data is sensor data, the application value of the first feature and the application value of the second feature may be an application first sensor value captured by means of the first sensor and an application second sensor value captured by means of the second sensor respectively. The application value of the target feature may be used for determining a control quantity for controlling the machine dependent on the application first sensor value, the application second sensor value and/or the application value of the further feature. Thus, the trained ML-module may serve for controlling the machine.

Referring to the example according to which the training data may be provided by means of the one or more entities, for example the communication devices, the application value of the target feature may be a status of an alarm signal of the one exemplary entity of the entities being set or not being set. The first feature may describe a first property of the exemplary entity, for example a number of active connections to further communication devices. The second feature may describe a second property of the exemplary entity, for example a number of messages sent from the exemplary entity within a given period of time. According to this simple application example, the trained ML-module may be used to predict the status of the alarm signal of the exemplary entity dependent on at least the application value of the first feature, the application value of the second feature and/or the application value of the further feature.

The computer system may automatically generate each value of the further set of data of each data record by applying a mathematical function to the value of the first set of data and/or to the value of the second set of data of the respective data record. For example, the computer system may calculate each value of the further set of data of each data record as a weighted sum, weighted product or weighted ratio of the value of the first set of data and the value of the second set of data of the respective data record. In case, the first feature describes an age, and the second feature refers to an income, the computer system may calculate each value of the further set of data of each data record as a ratio, for example a weighted ratio, of the value of the first set of data and the value of the second set of data of the respective data record. The values of the first set of data may be weighted with "1000" in this case.

An adding of the respective value of the further set of data, i.e. the respective value of the further feature, to the respective data record may be performed by extending a dimension of the respective data record. As a number of dimensions of each data record may match a number of inputs of the ML-module and outputs of the ML-module together a further input of the ML-module may be provided in response to adding the respective value of the further feature to the respective data record. According to a further example, the adding of the respective value of the further feature to the respective data record may be performed by replacing the respective value of the selected feature or of the below mentioned non-selected feature with the respective value of the further feature in the respective data record.

The first correlation metric may be the Pearson correlation coefficient. The computer system may calculate the first correlation metric dependent on the further set of data and the selected set of data. The first threshold may be in the range of "0.5" and "0.9", for example may be equal to "0.7". In one example, the ML-module may not be trained on the basis of the further set of data if the first correlation metric is greater than "0.9".

Automatically generating the further data set may involve performing an automatic selection of the mathematical function from a function set. The computer system may perform the selection randomly, in one example. In one example, the computer system may perform repetitions of the generating of the further set of data, the calculating of the first correlation metric, the checking whether the first correlation metric is greater than the first threshold, the adding of the respective value of the further set of data to the respective data record, the performing of the training of the ML-module, the defining of the first and second subset of values of the further feature, the determining of the bias metric and the checking whether the bias metric satisfies the bias constraint. In one example, the computer system may perform these repetitions until the bias metric satisfies the bias constraint. The computer system may release the ML-module for the usage if the bias metric satisfies the bias constraint. When performing a single repetition of the repetitions, the computer system may change the mathematical function, a dependency of the values of the further set of data to the values of the first and second set of data, a method of computing the first correlation metric, the first threshold, values of structural parameters of the ML-module, values of parameters specifying the training of the ML-module and/or a method of defining the first and second subset of values of the further feature with respect to a previous repetition of the repetitions. Varying the dependency of the values of the further set of data to the values of the first and second set of data may involve generating the values of the further set of data dependent on the values of the first set of data in one repetition of the repetitions, generating the values of the further set of data dependent on the values of the second set of data in another repetition of the repetitions and generating the values of the further set of data dependent on the values of the first set of data and the second set of data in a further other repetition of the repetitions. The computer system may perform the repetitions fully automatically without any interference by the user.

The term "module" as used herein refers to any known or in the future developed hardware, software such as an executable program, artificial intelligence, fuzzy-logic or combination hereof for performing a function associated with the "module" or being a result of having performed the function associated with the "module".

Sending the application input values to inputs of the ML-module may be considered as a request for using the ML-module for predicting the application value of the target feature. The application input values may be considered as an application input dataset of the ML-module. The ML-module may comprise a neuronal net, a convolutional neuronal net and/or a radial basis function net. The ML-module may perform a calculation of the application value of the output of the ML-module comprising the application value of the target feature dependent on values of model parameters of the ML-module. The model parameters of the ML-module may specify the neuronal net, the convolutional neuronal net and/or the radial basis function net, once a structure of the ML-module is defined and the training is completed. The model parameters may be weights of the neuronal net, in one example. The structure of the ML-module may be specified by means of the values of the structural parameters, such as number of neurons and number of hidden layers, for example. The model parameters may vary during the training of the ML-module whereas the structural parameters may be constant during the training of the ML-module.

The application input values and the application value of the output of the ML-module may each comprise real values. In one example, the application value of the output of the ML-module may have a binary format, for example to express if the alarm signal of the exemplary entity is set or not. In one example, the application value of the target feature may represent a probability to which of two or several classes the application input dataset or an instant or entity which corresponds to the application input dataset may be categorized.

Regarding the aforementioned example, the application value of the output of the ML-module may be a confidence value on how probable it is that the alarm signal of the exemplary entity is set or should be set given the application value of the first and/or second feature. This example is referred to as first use case in the following.

Before performing the training of the ML-module, the ML-module may be in an untrained state. In the untrained state, the values of the model parameters may be equal to random values. This may be achieved by performing an initialization of the ML-module, wherein the values of the model parameters may be set to random values. The computer system may perform the training of the ML-module on the basis of the training data, i.e., the data records. The ML-module may be in a trained state after the training.

A format of the values of the first and the second set of data may be equal to a format of the application value of the first and second feature. The same may apply for the values of the target feature of the data records and the application value of the target feature.

The data records may represent information about a classification problem, for which the trained ML-module may be used. In one example, the respective value of the target feature of each data record may be a measure how probable it is to group a training input dataset comprising the respective value of the further set of data and/or the respective value of the first set of data and/or the second set of data of the respective data record, and by that the corresponding entity or instant corresponding to the respective data record, correctly into a respective class. Regarding the first use case, the values of the target feature of each data record may be each a confidence value for an alarm signal of the respective entity or at the respective instant being set.

The values of the first and the second feature of each data record may each specify the entity or instant corresponding to the respective data record. For example, a value of the income and a value of the age of each data record may specify the respective entity corresponding to the respective data record. In one example, the respective entity may be associated to a respective person.

The computer system may perform the training of the ML-module such that the values of the model parameters of the ML-module may be adapted to reduce a training error of the ML-module. The training error may be calculated on the basis of deviations of the calculated training output values of the output of the ML-module calculated by means of the ML-module and the values of the target feature of each data record. Each training output value of the output of the ML-module may be calculated on the basis of at least the value of the further feature of the respective data record and may therefore be associated to the respective data record. The training output values of the output of the ML-module may have the same format as the values of the target feature. In most cases, the computer system may calculate the respective training output value of the output of the ML-module dependent on the value of the further feature and the value of the first and/or second set of data of the respective data record.

Adapting the values of the model parameters of the ML-module on the basis of the deviations may reduce the training error. If the training error reaches a given threshold, then the ML-module may be regarded as being trained and may be in the trained state. Adapting the values of the model parameters of the ML-module may be performed using one or more learning algorithms such as linear regression, back-propagation, K-means, etc., often referred to as "machine learning". Hence, the name "machine learning module". The ML-module is either trained by machine learning and by that in the trained state; or machine learning may be applied to the ML-module in order to change the state of the ML-module from the untrained state to an intermediate trained state or to the trained state or from the intermediate trained state to the trained state. The ML-module may have different training states, for example the intermediate trained state, between the untrained and the trained state. In each different training state, the ML-module may comprise a different combination of values of the model parameters of the ML-module.

The computer system may determine the bias metric by means of test datasets. Each test dataset may have the same format as the application input dataset. Furthermore, each test dataset may comprise a value corresponding to the further feature and a value corresponding to the first feature, in case the application input dataset comprises a value of the first feature, and a value corresponding to the second feature, in case the application input dataset comprises a value of the second feature. Furthermore, it is assumed that the test datasets and the application input dataset each comprise a value of the selected feature though this need not necessarily be the case.

A generation of the test datasets may involve a creation of a set of test values of the selected feature comprising a lower bound and an upper bound of these test values. The test values of the selected feature may be equal to the values of the first feature of the data records or equal to the values of the second feature of the data records depending on whether the first or the second feature is the selected feature respectively. In one example, the test values of the selected feature may be generated independently from the values of the data records, for example randomly. The feature of the first feature and the second feature which is not the selected feature may be referred to as the non-selected feature in the following.

The computer system may compute the values of the further feature of the test datasets dependent on the test values of the selected feature and dependent on the above-mentioned mathematical function.

In one example, the computer system may compute the values of the further feature of the test datasets dependent on the test values of the selected feature and randomly computed values of the non-selected feature and dependent on the above-mentioned mathematical function. The randomly computed values of the non-selected feature may be distributed equally between a lower bound of the values of the non-selected feature and an upper bound of the values of the non-selected feature. The values of the non-selected feature of the test datasets may be equal to the randomly computed values of the non-selected feature, in one example.

According to a further example, the values of the non-selected feature of the test datasets may be the values of the non-selected feature of the data records. In this case, the computer system may compute the values of the further feature of the test datasets dependent on the test values of the selected feature and the values of the non-selected feature of the data records and dependent on the above-mentioned mathematical function. The test datasets may allow to cover an input space of the ML-module in an arbitrary manner, for example by using the random values of the non-selected feature.

In one example, the first and second subset of the values of the further feature may be defined by a subset threshold of the further feature. Each value of the further feature which is less than the subset threshold of the further feature may be associated to the first subset of the values of the further feature. Analogously, each value of the further feature which is greater than or equal to the subset threshold of the further feature may be associated to the second subset of the values of the further feature.

In one example, the subset threshold of the further feature may be defined by a user, for example a supervisor supervising the generation of the ML-module. In this case, the subset threshold of the further feature may be defined independently from a subset threshold of the selected feature.

According to another example, the computer system may calculate the subset threshold of the further feature dependent on the subset threshold of the selected feature and dependent on the above-mentioned mathematical function. Hence, the subset threshold of the further feature may be a function of the subset threshold of the selected feature, wherein the function is also used to compute the values of the further feature dependent on at least the values of the selected feature. Furthermore, the computer system may compute the subset threshold of the further feature dependent on a chosen value of the non-selected feature, in case the values of the further feature are dependent on the values of the non-selected feature. The subset threshold of the selected feature may be defined by the user.

The computer system may divide the test datasets dependent on the values of the further feature of the test datasets. In one example, the test datasets may be divided into at least two groups, a first and a second group. The test datasets of the first group may respectively comprise a value of the further feature which is associated to the first subset of the values of the further feature. Analogously, the test datasets of the second group may respectively comprise a value of the further feature which is associated to the second subset of the values of the further feature.

The bias metric may be used to check up to which extend a bias optimization criterion is satisfied. The bias optimization criterion may be given by the user. In one example, the bias optimization criterion may involve that a probability for calculating a given test output value of the output of the ML-module may be independent of the values of the further feature. The given test output value of the output of the ML-module may be equal to "1" in case the output value of the ML-module is a binary value. Referring to the first use case, the value "1" of the given test output value of the output of the ML-module may correspond to a situation in which the alarm signal of the exemplary entity is set or should be set.

For calculating the bias metric, the computer system may compute a corresponding test output value of the output of the ML-module for each test dataset by means of the trained ML-module and dependent on the respective test dataset. To realize this, the values of the respective test datasets may be sent to the trained ML-module. Dependent on each test output value of the output of the trained ML-module corresponding to one of the test datasets of the first group a first probability may be calculated. The first probability may indicate a probability that the application output value of the output of the trained ML-module is equal to "1" if the application input dataset can be associated to the first group of the test datasets. The first probability may be computed as a ratio of a number of those test output values which are equal to "1" and correspond to the test datasets of the first group and a total number of test datasets of the first group multiplied by 100%.

Analogously, the computer system may compute a second probability dependent on each test output value corresponding to one of the test datasets of the second group. The second probability may indicate a probability that the application output value of the output of the trained ML-module is equal to "1" if the application input dataset can be associated to the second group of the test datasets. The second probability may be computed as a ratio of a number of those test output values which are equal to "1" and correspond to the test datasets of the second group and a total number of test datasets of the second group multiplied by 100%.

The bias metric may be equal to a difference between the first probability and the second probability. The bias metric may correspond to a statistical parity difference in this case. In another example, the bias metric may be equal to the ratio of the first probability and the second probability. The bias metric may correspond to a disparate impact ratio in this case. In this case, the bias constraint may be that the bias metric is higher than "0.9", for example. Generally, the bias constraint may be designed such that the bias metric satisfies the bias constraint if the bias metric is higher than a given bias threshold, for example "0.9".

In a further variant, the computer system may determine the bias metric dependent on a number of false positive test output values computed by means of the test datasets of the first group, in the following referred to as first false positive number; a number of false positive test output values computed by means of the test datasets of the second group, in the following referred to as second false positive number. Alternatively, or in addition, the computer system may determine the bias metric dependent on a number of false negative test output values computed by means of the test datasets of the first group, in the following referred to as first false negative number; a number of false negative test output values computed by means of the test datasets of the second group, in the following referred to as second false negative number. The bias metric may be equal to the ratio between the first false positive number and the second false positive number or the ratio between the first false negative number and the second false negative number. Alternatively, the bias metric may be equal to an average of the ratio between the first false positive number and the second false positive number and the ratio between the first false negative number and the second false negative number. The last-mentioned bias metric may be referred to as separation criterion in the following.

Generally, performing the training of the ML-module dependent on at least the values of the further feature may serve to increase an accuracy of the ML-module, for example by reducing the training error. Furthermore, this may reduce a bias of the ML-module with respect to the selected feature. By adding the values of the further feature to the data records a dimension of the input space of the ML-module may be increased. Such an increment of the dimension of the input space may alleviate training the ML-module such that the bias of the ML-module with respect to the selected feature may be reduced compared to a training of the ML-module without using the values of the further feature. This may be explained as follows. Using the values of the further feature may increase a number of values of the data records of the training of the ML-module. As a consequence, a number of the model parameters of the ML-module may be increased without risking an overfitting of the ML-module during the training. A higher number of model parameters of the ML-module may increase a chance to yield a low bias metric of the trained ML-module as a higher number of model parameters of the ML-module may generally alleviate reaching the bias optimization criterion.

This effect may be increased or may be achieved with less computational effort during the training if the values of the further feature are generated dependent on the values of the selected set of data and the values of the set of data of the first set of data and the second set of data which is not the selected set of data, in the following referred to as non-selected set of data. This is because using the non-selected set of data and the selected set of data for generating the values of the further set of data may allow to further increase the number of model parameters of the ML-module during the training of the ML-module.

Thus, according to one embodiment, the generating of the further set of data comprises generating the further set of data dependent on the selected set of data and the non-selected set of data.

Determining the bias metric and checking if the bias metric satisfies the bias constraint may allow to test whether the bias of the trained ML-module with respect to the further feature has built at all or has built to a certain allowable extend. If the bias metric satisfies the bias constraint, then it may be assumed that the ML-module is fair, that is the ML-module is not biased towards the first or second subset of values of the further feature within the allowable extend. As a result, neither the first nor the second subset of values of the further feature may be privileged. This may allow to yield good performance in controlling the machine in different operating points of the machine, for example operating points covered by the first subset and the second subset. On the other hand, this may allow to prevent the ML-module to have a bias towards a subset of values of the selected feature and/or the first or second subset of the values of the further feature.

In one example, the determining of the bias metric and the checking whether the bias metric satisfies the bias constraint may only be performed if the first correlation metric is greater than the first threshold. This is due to the assumption that a higher value of the first correlation metric may provoke a higher value of the bias metric. If the value of the first correlation metric is comparatively low, then there may be no need to check whether the bias metric satisfies the bias constraint.

If the bias metric satisfies the bias constraint, the ML-module may be released for usage, for example for computing the application value of the target feature dependent on the application input values as mentioned above.

The above-mentioned machine learning algorithm, for example the backpropagation algorithm, may be used to calculate a respective change of a value of each model parameter of the ML-module by means of a respective derivative of the bias optimization criterion with respect to the respective value of the respective model parameter of the ML-module. In one example, the bias optimization criterion may be equal to the norm of a difference between "1" and the ratio of the first probability and the second probability. This norm should be minimized as the ratio of the first probability and the second probability should be equal to "1". In one example, this norm may be added to the above-mentioned training error. In this case, a sum of the training error and the bias optimization criterion may be reduced in each gradient-based iteration of the training of the ML-module.

According to one embodiment, the generating of the further set of data may comprise generating the further set of data dependent on the selected set of data. This may allow to approximate a-priori conditional probabilities given as a function of the values of selected set of data more accurately. This effect may be useful if the bias metric is similar or equal to the above-mentioned separation criterion. This effect may also be obtained if the further set of data is generated dependent on the selected set of data and the non-selected set of data. Using the non-selected set of data for the generating of the further set of data may additionally allow to train the ML-module with a higher number of model parameters of the ML-module for reducing the bias of the ML-module with respect to the selected feature and/or the further feature.

According to one embodiment, the generating of the further set of data may comprise generating the further set of data dependent on the non-selected set of data. According to this embodiment, the generating of the further set of data may be performed independently of the selected set of data. In this case, checking whether the bias metric satisfies the bias constraint may prevent to release the ML-module for usage although the trained ML-module may have a bias towards either first subset or the second subset. This may be especially useful if the generation of the ML-module is fully automated.

According to one embodiment, the selected feature may be selected by the user. According to this embodiment, the method may further comprise calculating a second correlation metric as a measure of a correlation between the non-selected feature and the selected feature dependent on the non-selected set of data and the selected set of data. The method may further comprise checking whether the second correlation metric is greater than a second threshold.

Furthermore, the training of the ML-Module may comprise training the ML-module dependent at least on the non-selected set of data. For example, the training of the ML-Module may comprise computing the respective training output value of the output of the ML-module for each data record by means of the ML-module and dependent on the value of the non-selected set of data of the respective data record. The method may further comprise defining at least a first subset of values of the non-selected feature and a second subset of values of the non-selected feature. The first subset and the second subset of the values of the non-selected feature may be disjoint subsets. In addition to that, a further bias metric indicating a strength of a bias of the ML-module towards the first subset of values of the non-selected feature or the second subset of values of the non-selected feature may be determined if the second correlation metric is greater than the second threshold.

Furthermore, the computer system may check whether the further bias metric satisfies a further bias constraint. The ML-module may be released for usage if the further bias metric satisfies the further bias constraint. The advantage of this embodiment may be that an incomplete selection of the user with respect to selecting all possible features, here among the first and the second feature, which may provoke the trained ML-model to be biased may be automatically compensated. If the second correlation metric is greater than the second threshold, then this may increase a risk that the trained ML-module comprises a bias towards either the first subset of values of the non-selected feature or the second subset of values of the non-selected feature, i.e., the trained ML-module may be "unfair". As the further bias metric is determined and checked against a further bias threshold in this case, the incomplete selection of the user may be compensated according to this embodiment. The determining of the further bias metric and the checking whether the further bias metric satisfies the further bias constraint may be performed analogously to the determining of the bias metric and the checking whether the bias metric satisfies the bias constraint; however, instead of using the further set of data the non-selected set of data may be used and instead of the bias threshold the further bias threshold may be applied.

According to one embodiment, the method may further comprise performing the computing of the first correlation metric and/or the checking whether the first correlation metric is greater than the first threshold dependent on user correlation input data. The user correlation input data may comprise the first threshold. Thus, this embodiment may allow the user to have an influence whether the trained ML-module is tested with respect to its bias. The higher the first threshold, the lower a probability may be that the trained ML-module is tested with respect to its bias.

According to one embodiment, the method may further comprise defining the at least first subset of values of the further feature and the second subset of values of the further feature dependent on user bias input data. For example, the user bias input data may comprise the subset threshold of the further feature and/or a lower limit of the first subset of values of the further feature and/or an upper limit of the second subset of values of the further feature. Hence, this embodiment may allow the user to influence the calculation of the bias metric.

According to one embodiment, the method may further comprise storing the bias metric in the form of a first part of meta data of the trained ML-module for monitoring the bias of the trained ML-module with respect to the further feature when using the trained ML-module for computing further values of the output of the ML-module dependent on application input datasets comprising each at least a value corresponding to the further feature. The application input datasets may comprise and may be designed similarly to the above-mentioned application input dataset. The method may further comprise aborting the usage of the ML-module if the bias of the ML-module with respect to the further feature increases. A change in the bias of the ML-module with respect to the further feature may be detected by computing the bias metric as described above again and using the values of the application input datasets instead or additionally to the values of the data records.

According to one embodiment, the method may further comprise storing the first correlation metric as a second part of the meta data of the trained ML-module. The first correlation metric may be used for monitoring the bias of the trained ML-module with respect to the further feature when using the trained ML-module for computing the further values of the output of the ML-module dependent on the application input datasets comprising each at least a value corresponding to the further feature.

In one example, a further first correlation metric as a measure of the correlation between the selected feature and the further feature may be computed dependent on values of the selected feature of the application input datasets and on values of the further feature calculated dependent on the application input datasets. The further first correlation metric may be compared with the first correlation metric. If the further first correlation metric is lower than the first correlation metric, then the bias metric may not be recalculated and the bias of the trained ML-module with respect to the further feature may not be checked when using the trained ML-module for the computing of the further values of the output of the ML-module. On the other hand, if the further first correlation metric is higher than the first correlation metric, then the bias constraint may be tightened. For example, the bias threshold may be increased.

According to one embodiment, the method may further comprise storing the further bias metric as a third part of the meta data of the trained ML-module for monitoring the bias of the trained ML-module with respect to the non-selected feature when using the trained ML-module for computing the further values of the output of the ML-module dependent on the application input datasets comprising each at least a value corresponding to the non-selected feature. The method may further comprise aborting the usage of the ML-module if the bias of the ML-module with respect to the non-selected feature increases. A change in the bias of the ML-module with respect to the non-selected feature may be detected by computing the further bias metric as described above again and using the values of the application input datasets instead or additionally to the values of the data records.

According to one embodiment, the method may further comprise storing the second correlation metric as a fourth part of the meta data of the trained ML-module for monitoring the bias of the trained ML-module with respect to the non-selected feature when using the trained ML-module for computing the further values of the output of the ML-module dependent on the application input datasets comprising each at least a value corresponding to the non-selected feature.

In one example, a further second correlation metric as a measure of the correlation between the selected feature and the non-selected feature may be computed dependent on the values of the selected feature of the application input datasets and on values of the non-selected feature of the application input datasets. The further second correlation metric may be compared with the second correlation metric. If the further second correlation metric is lower than the second correlation metric, then the further bias metric may not be recalculated and the bias of the trained ML-module with respect to the non-selected feature may not be checked when using the trained ML-module for the computing of the further values of the output of the ML-module. On the other hand, if the further second correlation metric is higher than the second correlation metric, then the further bias constraint may be tightened. For example, the further bias threshold may be increased.

According to one embodiment, the method may further comprise modifying a structure of the ML-module, repeating the performing of the training of the ML-Module, repeating the computing of the bias metric, checking whether the bias metric has decreased. If the bias metric has decreased, then the ML-module with the modified structure may be released for usage and the former version of the ML-module may be rejected.

The structure of the ML-module may be specified by the structural parameters. The structural parameters may comprise the number of hidden layers, the number of neurons or a type of activation functions of the neurons if the ML-module comprises a neuronal net or may comprise a kernel type if the ML-module comprises a support vector machine. Hence, the modifying of the structure may comprise changing the number of hidden layers, number of neurons and/or the type of activation function if the ML-module comprises the neuronal net or changing the kernel type if the ML-module comprises the support vector machine. The modifying of the structure of the ML-module may enable to further reduce the bias of the trained ML-module with respect to the selected feature and/or the further feature.

According to one embodiment, the method may further comprise performing several repetitions of the modifying of the structure of the ML-module, of the performing of the training of the ML-Module and of the computing of the bias metric. The method may further comprise recording a respective set of values of structural parameters specifying the structure of the ML-module for each repetition and storing the sets of values of the structural parameters each together with the respective bias metric for providing a data base for optimizing a structure of a further ML-module with respect to reducing a bias of the further ML-module. In one example, the respective set of values of the structural parameters specifying the structure of the ML-module may comprise the number of hidden layers, number of neurons and/or the type of activation function of the structure of the ML-module created in the respective repetition of the modifying of the structure. The data base may alleviate finding appropriate values of structural parameters of the further ML-module.

Embodiments of the present invention may be implemented using a computing device that may also be referred to as a computer system, a client, or a server. Referring now to FIG. 1, a schematic of an example of a computer system 1 is shown. Computer system 1 is only one example of a suitable computer system and is not intended to suggest any limitation as to the scope of use or functionality of embodiments of the invention described herein. Regardless, computer system 1 is capable of being implemented and/or performing any of the functionality set forth hereinabove.

The computer system 1 comprises a first computer system/server 12 as shown in FIG. 1.

The first computer system/server 12 may be operational with numerous other computing system environments or configurations. Examples of well-known computing systems, environments, and/or configurations that may be suitable for use with the first computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

The first computer system/server 12 may be described in the general context of computer system executable instructions, such as program modules, being executed by a computer system. Generally, program modules may include routines, programs, objects, components, logic, data structures, and so on that perform particular tasks or implement particular abstract data types. The first computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, the first computer system/server 12 in computer system 1 is shown in the form of a general-purpose computing device. The components of the first computer system/server 12 may include, but are not limited to, one or more processors or processing unit 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

First computer system/server 12 typically includes a variety of computer system readable media. Such media may be any available media that is accessible by first computer system/server 12, and it includes both volatile and non-volatile media, removable and non-removable media.

System memory 28 can include computer system readable media in the form of volatile memory, such as random access memory (RAM) 31 and/or cache memory 32. First computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 35, having a set (at least one) of program modules 50, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 50 generally carry out the functions and/or methodologies of embodiments of the invention as described herein.

First computer system/server 12 may also communicate with one or more external devices 14 such as a keyboard, a pointing device, a display 24, etc.; one or more devices that enable a user to interact with first computer system/server 12; and/or any devices (e.g., network card, modem, etc.) that enable first computer system/server 12 to communicate with one or more other computing devices. Such communication can occur via Input/Output (I/O) interfaces 22. Still yet, first computer system/server 12 can communicate with one or more networks such as a local area network (LAN), a general wide area network (WAN), and/or a public network (e.g., the Internet) via network adapter 25. As depicted, network adapter 25 communicates with the other components of first computer system/server 12 via bus 18. It should be understood that although not shown, other hardware and/or software components could be used in conjunction with first computer system/server 12. Examples, include, but are not limited to: microcode, device drivers, redundant processing units, external disk drive arrays, RAID systems, tape drives, and data archival storage systems, etc.

A computer system such as the computer system 1 shown in FIG. 1 may be configured to perform operations disclosed herein such as providing training data 100, in the following also referred to as first function. In one example, the computer system 1 may provide the training data 100 by executing a training data retrieval module 51 on the processor 16. An execution of the data retrieval module 51 may provoke loading the training data 100 from the storage system 34 into the RAM 31. The training data 100 may comprise a first set of data 10, a second set of data 20 and a set of target data 30. The first set of data 10 may comprise values 101, 102, 10*i*, 10*n* corresponding to a first feature. The second set of data 20 may comprise values 201, 202, 20*i*, 20*n* corresponding to a second feature. The set of target data 30 may comprise values 301, 302, 30*i*, 30*n* corresponding to a target feature. Thus, the first set of data 10, the second set of data 20 and the set of target data 30 may correspond to the first feature, the second feature and the target feature respectively. In one example, the values of the first feature and the second feature may describe each a property of a respective entity 300*i* of a communication system 3000 as described above. The values of the target feature may describe respectively a status of or an action being performed by or with the respective entity 300*i*, for example an alarm signal of or referring to the respective entity 300*i* being set or not, according to the first use case described above.

The training data 100 may be structured into respective data records 110 (1101, 1102, 110*i*, 110*n*). The data records may be stored in a data base 120 of the storage system 34. Each data record 110*i* may comprise the respective value 10*i* of the first set of data 10, that is the respective value 10*i* of the first feature. Furthermore, each data record 110*i* may comprise the respective value 20*i* of the second set of data 20, that is the respective value 20*i* of the second feature. In one example, each data record 110*i* may comprise the respective value 30*i* of the set of target data 30, that is the respective value 30*i* of the target feature. One of the first and the second feature may be a selected feature. In the following, it is assumed that the first feature is the selected feature. Thus, the first set of data 10 may be considered as a selected set of data. Furthermore, it may be assumed that the second feature is a non-selected feature in the following. Analogously, the second set of data 20 may be considered as a non-selected set of data. However, in a further example, the second feature may a further selected feature. The first feature may be selected by a user of the computer system 1, for example by supplying input data referring to a selection of the first feature by means of the one or more external devices 14, for example the keyboard.

The computer system 1 may automatically generate a further set of data 40 dependent on at least one set of data of the first set of data 10 and the second set of data 20, in the following also referred to as second function. The further set of data 40 may correspond to a further feature. The further set of data 40 may comprise values 401, 402, 40i, 40n of the further feature. The processor 16 may select and use a mathematical function from a set of functions to generate the respective value 40i of the further set of data 40 dependent on the respective value 10i of the first set of data 10 and/or the respective value 20i of the second set of data 20. The processor 16 may execute a function module 52 for performing the second function.

In a simple example, the first feature may be an age. Hence, the respective value 10i may describe a respective age corresponding with the respective entity 300i. Furthermore, according to this simple example, the second feature may be an income. Thus, the respective value 20i may describe a respective income corresponding with the respective entity 300i. In one example, the mathematical function for determining the respective values 40i of the further feature may be as follows:

$$40\_i = (10\_i * 1000)/20\_i$$

In a further example, the respective values 40i of the further feature may be calculated only dependent on the values 10i of the selected feature. In this case, the mathematical function for determining the respective values 40i of the further feature may be as follows:

$$40\_i = [lr_{10}(4+10)\_i)$$

The logarithmic function as the mathematical function may provoke that the respective values 10i of the selected feature may have a derivative with respect to the respective values 10i of the selected feature which has a value below approximately 0.25.

Figure 3:
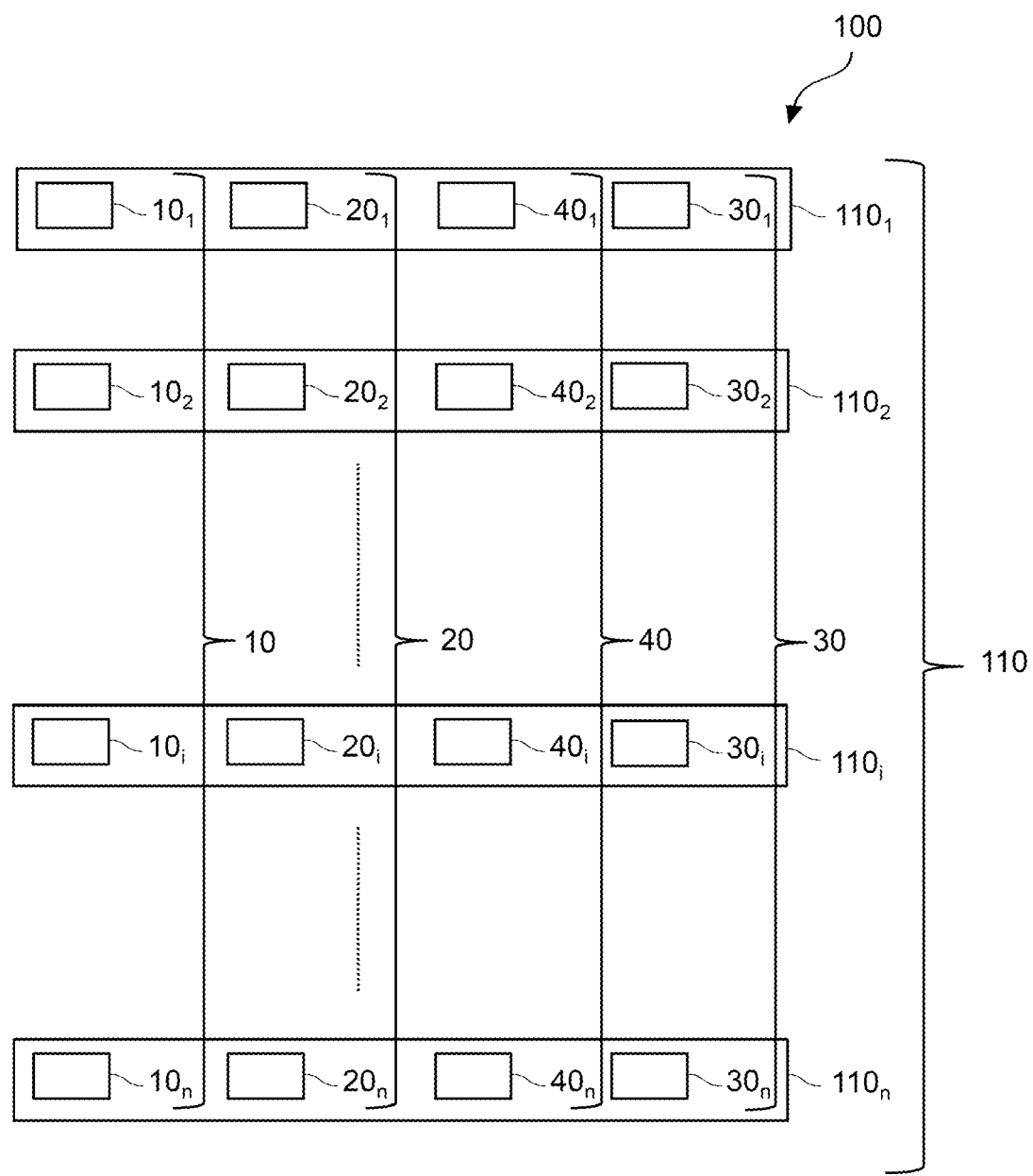
FIG. 3 depicts training data comprising training records for training an ML-module of the computer system shown in FIG. 1.

The computer system 1 may be configured to add the respective value 40i of the further feature to the respective data record 110i, as shown in FIG. 3. For example, the RAM 31 may store a main program comprising a write command for writing the respective value 40i of the further feature into the respective data record 110i of the database 120.

The computer system 1 may calculate a first correlation metric as a measure of a correlation between the selected feature and the further feature dependent on the further set of data 40 and the selected set of data. The program modules 50 may comprise a statistics module 53 for calculating the Pearson correlation coefficient as a ratio between the covariance of the selected feature and the further feature and a product of the standard deviation of the selected feature and the standard deviation of the further feature dependent on the selected data set and the further data set 40.

The processor 16 may be configured to check whether the first correlation metric is greater than a first threshold, for example "0.7". To realize this, the main program may comprise a comparison operator.

Figure 4:
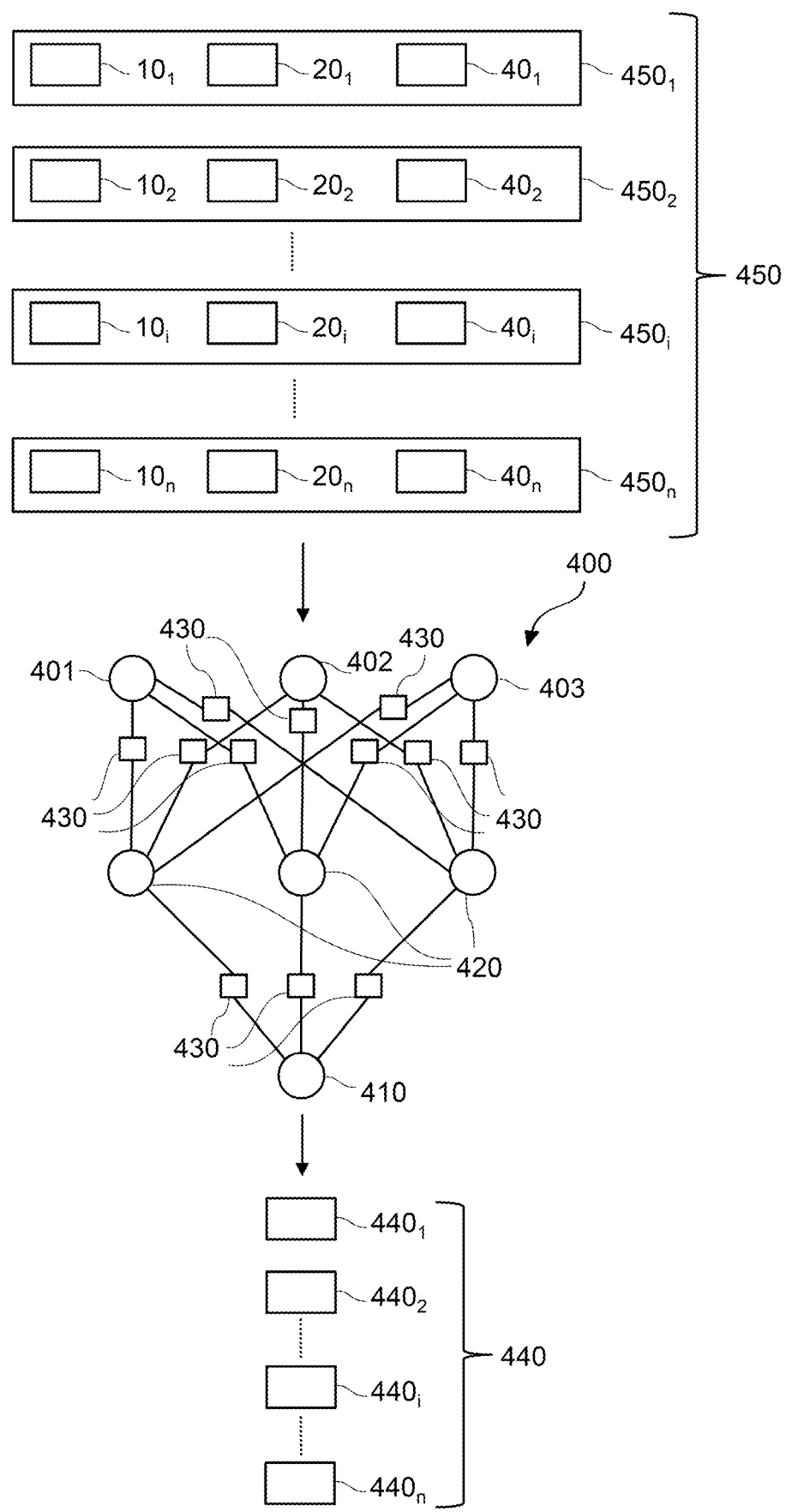
FIG. 4 depicts the ML-module of the computer system shown in FIG. 1.

The computer system 1 may perform a training of an ML-module 400 shown in FIG. 4 using the data records 110. The training may comprise computing training output values 440 (4401, 4402, 440i, 440n) of an output 410 of the ML-module 400 on the basis of the training data 100. Generally, the training may comprise computing the respective training output value 440i for each data record 110i by means of the ML-module 400 and dependent on at least the value 40i of the further set of data 40 of the respective data record 110i.

According to the example shown in FIG. 4, the computer system 1 may send the values of the first set of data 10, the second set of data 20 and the further set of data 40 in the form of training input datasets 450 to inputs of the ML-module 400 for performing the training. The processor 16 may compute the respective training output value 440i dependent on the respective value 10i of the first feature, i.e. the respective value 10i of the first set of data 10, dependent on the respective value 20i of the second feature, i.e. the respective value 20i of the first set of data 20, dependent on the respective value 40i of the further feature, i.e. the respective value 40i of the further set of data 40, and dependent on values of model parameters 430 of the ML-module 400. In one example, the model parameters 430 may be weights indicating a strength of a respective connection between one of the input neurons 401, 402, 403 of the ML-module 400 and one neuron of neurons 420 of a hidden lager of the ML-module 400, in case the ML-module 400 is a neuronal net. In this case, the input neurons 401, 402, 403 may build the inputs of the ML-module 400.

The processor 16 may send the respective value 10i of the first feature, the respective value 20i of the second feature and the respective value 40i of the further feature in the form of a respective training input dataset 450i to the inputs of the ML-module 400 in order to compute the respective training output value 440i.

The computer system 1 may comprise a training module 54 for performing the training of the ML-module 400. Executing the training module 54 may involve loading the data records 110, generating the training input datasets 450 on the basis of the data records 110, sending the training input datasets 450 to the inputs of the ML-module 400 and performing several training iterations of the ML-module 400.

A single training iteration may comprise computing the training output values 440, computing a training error dependent on the training output values 440 and the values 30 of the target feature, computing a respective change of the value of each model parameter of the model parameters 430 dependent on the training error and adapting each value of each model parameter of the model parameters 430 according to the respective change of the value of each model parameter of the model parameters 430. The training error may be a sum of quadrats, wherein each quadrat is a quadrat of a respective difference between the respective training output value 440i and the respective value 30i of the target feature of the respective data record 110i.

The processor 16 may compute the respective change of the value of each model parameter of the model parameters 430 by calculating a respective derivative of the training error with respect to the respective model parameter of the model parameters 430. The processor 16 may repeat performing the several of the single training iteration until the training error is below a training error threshold. If this training criterion is met, then the ML-module 400 may be in a trained state.

Figure 5:
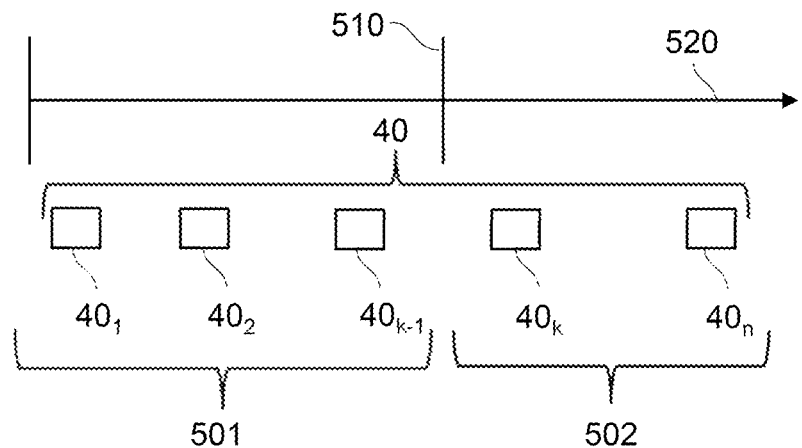
FIG. 5 shows values of a further feature divided into two subsets.

Furthermore, the processor 16 may define a first subset 501 of values of the further feature and a second subset 502 of values of the further feature, wherein the first subset 501 and the second subset 502 are disjoint subsets. In one example, the processor 16 may define the first subset 501 and the second subset 502 by means of a subset threshold of the further feature 510 and the values 40i of the further feature of the data records 110. All values of the further set of data 40 which are less than the threshold of the further feature 510 may be part of the first subset 501 and all values of the further set of data 40 which are greater than or equal to the threshold of the further feature 510 may be part of the second subset 502. The processor 16 may sort the values of the further set of data 40 in ascending order, indicated by an arrow 520 in FIG. 5, for generating the first subset 501 and the second subset 502. For example, a value 40*k* of the further set of data 40 may be the lowest value of the second subset 502 and a value 40*k*-1 of the further set of data 40 may be the highest value of the first subset 501.

In another example, which is not shown in the Figures, the processor 16 may define the first subset 501 and the second subset 502 by means of the subset threshold of the further feature 510 and arbitrarily generated values of the further feature. According to this example, all values of the arbitrarily generated values of the further feature which are less than the threshold of the further feature 510 may be part of the first subset 501 and all values of the arbitrarily generated values of the further feature which are greater than or equal to the threshold of the further feature 510 may be part of the second subset 502.

Furthermore, the processor 16 may determine a bias metric indicating a strength of a bias of the ML-module 400 towards the first subset 501 of values of the further feature or the second subset 502 of values of the further feature if the first correlation metric is greater than the first threshold.

Figure 6:
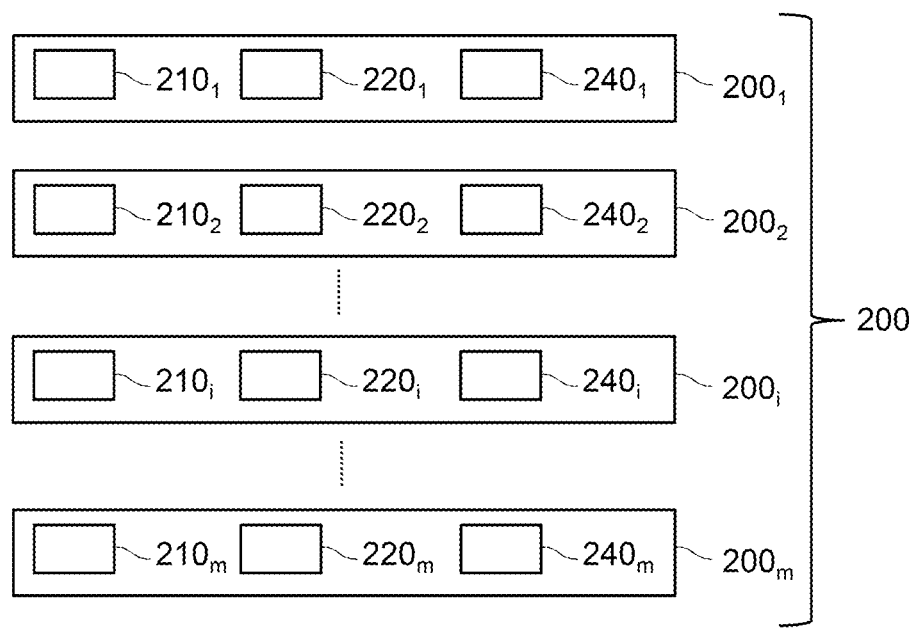
FIG. 6 depicts test datasets for computing a bias of the ML-module shown in FIG. 4.
Figure 7:
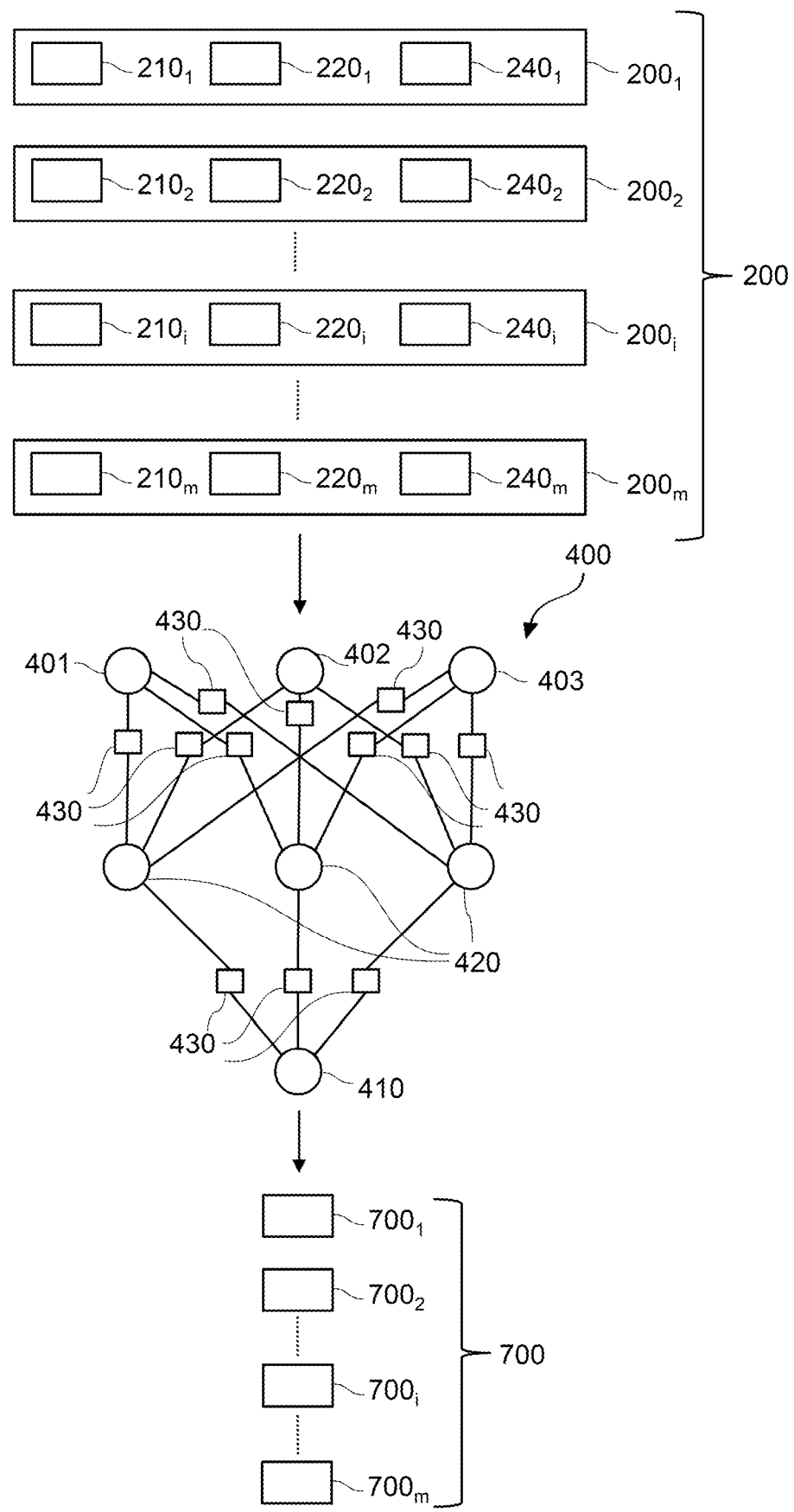
FIG. 7 depicts the trained ML-module shown in FIG. 4 and the test datasets shown in FIG. 6.
Figure 8:
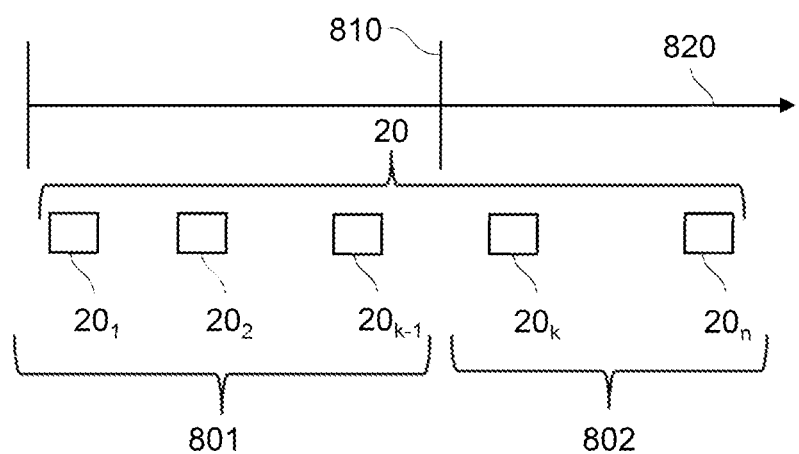
FIG. 8 shows values of a non-selected feature of the training data shown in FIG. 3 divided into two subsets.

The computer system 1 may provide test datasets 200 (2001, 2002, 200*i*, 200*m*). Each test dataset 200*i* may comprise a respective value 210*i* of the first feature, a respective value 220*i* of the second feature and a respective value 240*i* of the further feature. For the sake of clarity, a first value 2101, a second value 2102 and an m-th value 210*m* of the first feature, a first value 2201, a second value 2202 and an m-th value 220*m* of the second feature and a first value 2401, a second value 2402 and an m-th value 240*m* of the further feature of the test datasets 210 are depicted in FIG. 6. In one example, the computer system 1 may generate the values of the test datasets 200 independent from the data records 110 as described above. The processor 16 may generate a random set of values of the first and the second feature of the test datasets 200 and may calculate the values of the further feature of the test datasets 200 dependent on the random set of values of the first and the second feature of the test datasets 200 and the mathematical function.

For sake of simplicity, a variant is described in the following according to which the values of the test datasets 200 are equal to the values of the training input datasets 450. Thus, according to this example, the test datasets 200 may be equal to the training input datasets 450.

The computer system 1 may divide the test datasets 200 according to a division of the values of the further feature into the first subset 501 and the second subset 502 into two groups. In other words, the computer system 1 may divide the test datasets 200 such that to each subset of the values of the further feature one corresponding group of the test datasets 200 may be provided. In one example, test datasets of a first group of the test datasets 200 may each comprise a value of the further feature which is associated to the first subset 501. Analogously, the test datasets of a second group of the test datasets 200 may each comprise a value of the further feature which is associated to the second subset 502.

The bias metric may be used to check whether or how much a bias optimization criterion is satisfied. The bias optimization criterion may be given by the user. In one example, the bias optimization criterion may involve that a probability for calculating a given test output value of the output 410 of the trained ML-module 400 may be independent of the values of the further feature. The given test output value of the output 410 of the trained ML-module 400 may be equal to "1" in case the output value of the trained ML-module is a binary value. Referring to the first use case, the value "1" of the given test output value of the output 410 of the trained ML-module 400 may correspond to a situation in which the alarm signal is set or should be set.

For calculating the bias metric, the computer system 1 may compute a corresponding test output value 700*i* of the output 410 of the trained ML-module 400 for each test dataset 200*i* by means of the trained ML-module 400 and dependent on the respective test dataset 200*i*. To realize this, the computer system 1 may send the values of the first feature of the respective test datasets 200*i* to the first input neuron 401 of the trained ML-module 400, the values of the second feature of the respective test datasets 200*i* to the second input neuron 402 of the trained ML-module 400 and the values of the further feature of the respective test datasets 200*i* to the third input neuron 403 of the trained ML-module 400.

Dependent on each test output value 700*i* of the output 410 corresponding to one of the test datasets 200 of the first group a first probability may be calculated. The first probability may indicate a probability that an application output value of the output 410 of the trained ML-module 400 is equal to "1" if an application input dataset can be associated to the first group of the test datasets 200. The application input dataset may be associated to the first group if a value of the further feature of the application input dataset is part of the first subset 501, i.e. is less than the subset threshold of the further feature. The processor 16 may compute the application output value by means of the trained ML-module 400 dependent on the application input dataset.

The processor 16 may compute the first probability as a ratio of a number of those test output values 700 (7001, 7002, 700*i*, 700*m*) which are equal to "1" and correspond to the test datasets 200 of the first group and a total number of test datasets 200 of the first group multiplied by 100%.

Analogously, the computer system 1 may compute a second probability dependent on each test output value 700*i* corresponding to one of the test datasets 200*i* of the second group. The second probability may indicate a probability that the application output value of the output 410 of the trained ML-module 400 is equal to "1" if the application input dataset can be associated to the second group of the test datasets 200.

The processor 16 may compute the second probability as a ratio of a number of those test output values 700 (7001, 7002, 700*i*, 700*m*) which are equal to "1" and correspond to the test datasets 200 of the second group and a total number of test datasets 200 of the second group multiplied by 100%.

The bias metric may be equal to a difference between the first probability and the second probability. The bias metric may correspond to a statistical parity difference in this case. In another example, the bias metric may be equal to the ratio of the first probability and the second probability. The bias metric may correspond to a disparate impact ratio in this case. In this case, the bias constraint may be that the bias metric is higher than "0.9", for example. Generally, the bias constraint may be designed such that the bias metric satisfies the bias constraint if the bias metric is higher than a given bias threshold, for example "0.9".

The computer system 1 may release the trained ML-module for usage, for example for computing the application output value of the output 410 based on the application input dataset, if the bias metric satisfies the bias constraint.

According to a further application example, the computer system 1 may alternatively or in addition compute a second correlation metric as a measure of a correlation between the non-selected feature and the selected feature dependent on the non-selected set of data and the selected set of data, i.e. the first set of data 10 and the second set of data 20. The processor 1 may execute the statistics module 53 for calculating a further Pearson correlation coefficient as a ratio between the covariance of the selected feature and the non-selected feature and a product of the standard deviation of the selected feature and the standard deviation of the non-selected feature dependent on the selected data set and the non-selected data set.

Furthermore, the processor 16 may be configured to check whether the second correlation metric is greater than a second threshold, for example "0.7". The training of the ML-module 400 may be performed as described above involving sending the values of the non-selected set of data, i.e. the values 20*i* of the second set of data 20, to the second input 402 of the ML-module 400.

According to the further application example, the processor 16 may define a first subset 801 of values of the non-selected feature and a second subset 802 of values of the non-selected feature, wherein the first subset 801 and the second subset 802 are disjoint subsets. In one example, the processor 16 may define the first subset 801 and the second subset 802 by means of a subset threshold of the non-selected feature 810 and the values 20*i* of the non-selected feature of the data records 110. All values of the non-selected set of data, i.e. the second set of data 20 according to the examples given in the FIGS. 1 to 9, which are less than the threshold of the non-selected feature 810 may be part of the first subset 801 and all values of the non-selected set of data which are greater than or equal to the threshold of the non-selected feature 810 may be part of the second subset 802. The processor 16 may sort the values of the non-selected set of data in ascending order, indicated by an arrow 820 in FIG. 5, for generating the first subset 801 and the second subset 802. For example, a value 20*k* of the non-selected set of data may be the lowest value of the second subset 802 and a value 20*k*-1 of the non-selected set of data may be the highest value of the first subset 801.

In another example, which is not shown in the Figures, the processor 16 may define the first subset 801 and the second subset 802 by means of the subset threshold of the non-selected feature 810 and arbitrarily generated values of the non-selected feature. According to this example, all values of the arbitrarily generated values of the non-selected feature which are less than the threshold of the non-selected feature 810 may be part of the first subset 801 and all values of the arbitrarily generated values of the non-selected feature which are greater than or equal to the threshold of the non-selected feature 810 may be part of the second subset 802.

Furthermore, the processor 16 may determine a further bias metric indicating a strength of a bias of the ML-module 400 towards the first subset 801 of values of the non-selected feature or the second subset 802 of values of the non-selected feature if the second correlation metric is greater than the second threshold.

Analogously to computing the bias metric, the computer system 1 may divide the test datasets 200 into two further groups according to a division of the values of the non-selected feature into the first subset 801 and the second subset 802. In other words, the test datasets 200 may be divided such that to each subset of the values of the non-selected feature one corresponding group of the test datasets 200 may be provided. In one example, test datasets of a further first group of the test datasets 200 may each comprise a value of the non-selected feature which is associated to the first subset 801. Analogously, the test datasets of a further second group of the test datasets 200 may each comprise a value of the non-selected feature which is associated to the second subset 802.

The further bias metric may be used to check whether or how much a further bias optimization criterion is satisfied. The further bias optimization criterion may be given by the user. In one example, the further bias optimization criterion may involve that a probability for calculating a further given test output value of the output 410 of the trained ML-module 400 may be independent of the values of the non-selected feature. The further given test output value of the output 410 of the trained ML-module 400 may be equal to "1" in case the output value of the trained ML-module is a binary value. Referring to the first use case, the value "1" of the further given test output value of the output 410 of the trained ML-module 400 may correspond to a situation in which the alarm signal is set or should be set.

For calculating the further bias metric, the computer system 1 may compute the corresponding test output value 700*i* of the output 410 of the trained ML-module 400 for each test dataset 200*i* by means of the trained ML-module 400 and dependent on the respective test dataset 200*i* as described above.

Dependent on each test output value 700*i* of the output 410 corresponding to one of the test datasets 200 of the further first group a further first probability may be calculated. The further first probability may indicate a probability that an application output value of the output 410 of the trained ML-module 400 is equal to "1" if an application input dataset can be associated to the further first group of the test datasets 200. The application input dataset may be associated to the further first group if a value of the non-selected feature of the application input dataset is part of the first subset 801, i.e. is less than the subset threshold of the non-selected feature. The processor 16 may compute the application output value by means of the trained ML-module 400 dependent on the application input dataset.

The processor 16 may compute the further first probability as a ratio of a number of those test output values 700 (7001, 7002, 700*i*, 700*m*) which are equal to "1" and correspond to the test datasets 200 of the further first group and a total number of test datasets 200 of the further first group multiplied by 100%.

Analogously, the computer system 1 may compute a further second probability dependent on each test output value 700*i* corresponding to one of the test datasets 200*i* of the further second group. The further second probability may indicate a probability that the application output value of the output 410 of the trained ML-module 400 is equal to "1" if the application input dataset can be associated to the further second group of the test datasets 200.

The processor 16 may compute the further second probability as a ratio of a number of those test output values 700 (7001, 7002, 700*i*, 700*m*) which are equal to "1" and correspond to the test datasets 200 of the further second group and a total number of test datasets 200 of the further second group multiplied by 100%.

The further bias metric may be equal to a difference between the further first probability and the further second probability. In another example, the further bias metric may be equal to the ratio of the further first probability and the further second probability. The further bias metric may correspond to a further disparate impact ratio in this case. In this case, a further bias constraint may be that the further bias metric is higher than "0.85", for example. Generally, the further bias constraint may be designed such that the further bias metric satisfies the further bias constraint if the further bias metric is higher than a given bias threshold, for example "0.85".

The computer system 1 may release the trained ML-module for usage, for example for computing the application output value of the output 410 based on the application input dataset, if the further bias metric satisfies the further bias constraint.

Figure 9:
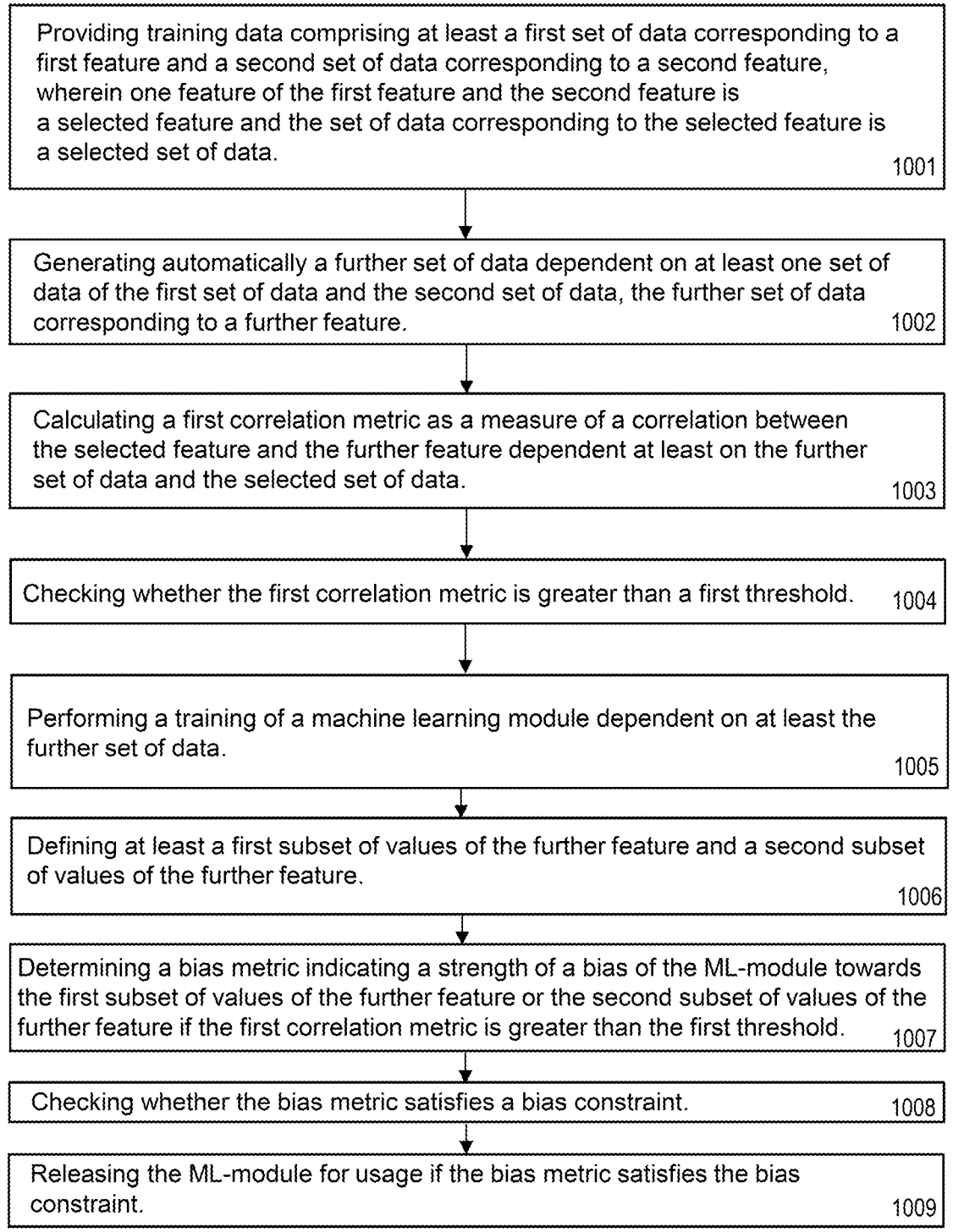
FIG. 9 depicts steps of a method for generating the ML-module shown in FIG. 4.

FIG. 9 shows a flowchart of a computer-implemented method for generating a machine learning module. In one example, the machine learning module may be the ML-module 400.

In step 1001, training data may be provided. The training data may comprise at least a first set of data corresponding to a first feature and a second set of data corresponding to a second feature. One feature of the first feature and the second feature may be a selected feature. The set of data corresponding to the selected feature may be a selected set of data. In one example, the training data may be the training data 100 and may be provided by means of the computer system 1.

In step 1002, a further set of data may be generated automatically dependent on at least one set of data of the first set of data and the second set of data. The further set of data may correspond to a further feature. The further set of data may be the further set of data 40. In one example, the respective value 40*i* of the further set of data 40 may be added to the respective data record 110*i*.

In step 1003, a first correlation metric may be calculated dependent at least on the further set of data and the selected set of data. The first correlation metric may a measure of a correlation between the selected feature and the further feature. In one example, the first correlation metric may be the Pearson correlation coefficient as mentioned above.

In step 1004, it may be checked whether the first correlation metric is greater than a first threshold.

In step 1005, a training of the machine learning module may be performed. In one example, performing the training of the machine learning module may comprise training the ML-module 400 by executing the training module 54 as described above.

In step 1006, at least a first subset of values of the further feature and a second subset of values of the further feature may be defined. In one example, the first subset may be the first subset 501 and the second subset may be the second subset 502.

In step 1007, a bias metric is determined if the first correlation metric is greater than the first threshold. The bias metric may indicate a strength of a bias of the machine learning module towards the first subset of values of the further feature or the second subset of values of the further feature. In one example, the bias metric may be the disparate impact ratio as described above.

In step 1008, it may be checked, for example by means of the processor 16, whether the bias metric satisfies a bias constraint. In one example, it may be checked whether the bias metric is greater than the given bias threshold.

In step 1009, the trained machine learning module may be released for usage if the bias metric satisfies the bias constraint.

A releasing of the trained machine learning module, for example of the trained ML-module 400, may comprise storing the trained ML-module 400, for example the model parameters 430 and the structural parameters of the trained ML-module 400, in a model database 600 of the storage system 34. The trained ML-module 400 may be loaded in form of the model parameters 430 and the structural parameters 430 and may be used for computing the above mentioned application value of the output variable dependent on the application input dataset and/or for computing the further values of the output. The computer system 1 may store the first correlation metric, the second correlation metric, the bias metric and/or the further bias metric in the form of meta data in the storage system 34. The meta data may be used to control the bias of the trained ML-module 400 with respect to the selected feature and/or the further feature when using the trained ML-module 400 for computing the above-mentioned further values of the output 410 of the ML-module 400 dependent on the above-mentioned application input datasets comprising each at least a value corresponding to the further feature.

The numeration of the steps of the computer-implemented method may not indicate an order for performing these steps. For example, the step 1006 may be performed before step 1005.

The computer system 1 may perform several repetitions of the step 1005, i.e. the training of the ML-module 400, and the step 1007, i.e. a computing of the bias metric. Before performing a single repetition of these repetitions, the processor 16 may perform a modifying of a structure of the ML-module 400. The modifying of the structure of the ML-module 400 may involve changing the above-mentioned structural parameters, such as the number of hidden layers and/or the number of neurons in the hidden layers of the neuronal net, in case the ML-module 400 is a neuronal net. The processor 16 may check whether the bias metric has decreased compared to one of the previous repetitions of the step 1005 and the step 1007 after each repetition of the step 1005 and the step 1007. If the bias metric has decreased, then the structural parameters 430 and the model parameters may be stored in order save the most recently trained version of the ML-module 400 as the best version of the ML-module 400. In one example, the several repetitions of the step 1005 and step 1007 may be performed after step 1008, even though the bias metric has already satisfied the bias constraint before. Performing the several repetitions of the step 1005 and step 1007 may reduce the bias of the ML-module 400 even further. The best version of the ML-module 400 may be released for the usage, in this example.

According to a further example, the several repetitions of the step 1005 and step 1007 and the modifying of the structural parameters 430 before each single repetition of the step 1005 and step 1007 may be performed before the bias metric has satisfied the bias constraint. In this example, performing the repetitions of step 1005 and step 1007 and the modifying of the structural parameters 430 before each single repetition of the step 1005 and step 1007 may enable to reduce the bias metric such that the bias metric may satisfy the bias constraint.

Figure 2:
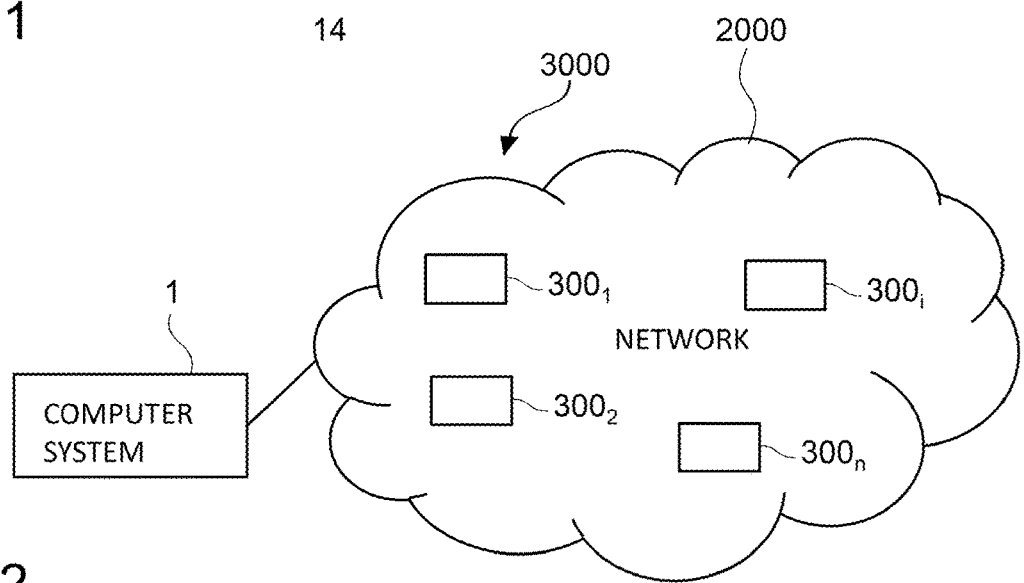
FIG. 2 is a block diagram illustrating a connection between the computer system shown in FIG. 1 and a network.

FIG. 2 shows an exemplary computing environment where a computer system such as computer system 1 is connected, e.g., using the network adapter 25, to a network 2000. Without limitation, the network 2000 may be a communications network such as the internet, a local-area network (LAN), a wireless network such as a mobile communications network, and the like. The network 2000 may comprise a computing network such as a cloud-computing network. In one example, the network 2000 may be part of the communication system 3000. The computer system 1 may have a connection to the entities 300 (3001, 3002, 300$i$, 300$n$,) of the communication system 3000 via the network 2000. The entities 300 may each be mobile devices which may communicate with each other via the network 2000. The computer system 1 may be configured to receive one respective data record 110$i$ from one respective entity 300$i$ of the entities 300. Each data record 110$i$ may correspond to one respective entity 300$i$ and may describe a status and/or properties of the respective entity 300$i$ in this case. Thus, the computer system 1 may receive the training data 100 to be processed from the network 2000. Hence, the training data 100 may be provided by the network 2000. Furthermore, the computer system 1 may provide a computing result, such as the values of the model parameters 430 of the trained ML-module 400, to another computing device connected to the computer system 1 via the network 2000, such as one of the entities 300.

The computer system 1 may perform operations described herein, entirely or in part, in response to receiving the training data 100 via the network 2000. In particular, the computer system 1 may perform such operations in a distributed computation together with one or more further computer systems that may be connected to the computer system 1 via the network 2000. For that purpose, the computer system 1 and/or any further involved computer systems may access further computing resources, such as a dedicated or shared memory, using the network 2000.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, the method comprising:
   receiving a plurality of data records from a plurality of networked entities, wherein each data record comprises a value corresponding to a first feature, a value corresponding to a second feature, and a target value;
   selecting either the first feature or the second feature as a selected feature;
   updating each data record with a generated further feature, wherein the further feature is calculated as either: a weighted ratio of the first feature to the second feature, or a logarithmic function of the first feature;
   calculating a first correlation metric as a measure of a correlation between the selected feature and the further feature;
   training a machine learning module (ML-module) until a training error is below a training error threshold, wherein the training comprises repeatedly:
      inputting each updated data record as training data to the ML-module, resulting in a respective change of a value of each model parameter, a training error, and training output values, each training output value corresponding to each input further feature;
   sorting the values of the generated further feature in ascending order, and dividing the sorted values of the generated further feature into a first subset dataset and a second subset dataset;
   determining a bias metric indicating a strength of a bias of the ML-module toward the first subset dataset or the second subset dataset, based on the correlation metric being greater than a threshold; and
   releasing the ML-module for usage if the determined bias metric satisfies a bias constraint, wherein the releasing comprises storing the model parameters and structural parameters of the ML-module, storing the correlation metrics, and bias metrics in a form of meta data of the ML-module.

2. The method of claim 1, the method further comprising storing the bias metric in the form of meta data of the trained ML-module for monitoring the bias of the trained ML-module with respect to the further feature when using the trained ML-module for computing values of an output of the ML-module dependent on application input datasets comprising each at least a value corresponding to the further feature.

3. The method of claim 1, the method further comprising storing the first correlation metric in the form of meta data of the trained ML-module for monitoring the bias of the trained ML-module with respect to the further feature when using the trained ML-module for computing values of an output of the ML-module dependent on application input datasets comprising each at least a value corresponding to the further feature.

4. The method of claim 1, the method further comprising storing the further bias metric in the form of meta data of the trained ML-module for monitoring the bias of the trained ML-module with respect to a non-selected feature when using the trained ML-module for computing values of an output of the ML-module dependent on application input datasets comprising each at least a value corresponding to the non-selected feature.

5. The method of claim 1 the method further comprising storing the second correlation metric in the form of meta data of the trained ML-module for monitoring the bias of the trained ML-module with respect to a non-selected feature when using the trained ML-module for computing values of an output of the ML-module dependent on application input datasets comprising each at least a value corresponding to the non-selected feature.

6. The method of claim 1, the method further comprising:
   modifying a structure of the ML-module;
   repeating the performing of the training of the ML-Module;
   repeating the determining of the bias metric;
   checking whether the bias metric has decreased; and
   releasing the ML-module with the modified structure for usage and rejecting a former version of the ML-module if the bias metric has decreased.

7. The method of claim 6, the method further comprising repeating the modifying of the structure of the ML-module, of the performing of the training of the ML-Module and of the computing of the bias metric and recording a respective set of values of structural parameters specifying the structure of the ML-module for each repetition and storing the sets of values of the structural parameters each together with the respective bias metric for providing a data base for optimizing a structure of a further ML-module with respect to reducing a bias of the further ML-module.

8. The method of claim 7, the method further comprising storing the sets of values of the structural parameters each together with the respective bias metric in the form of meta data of the ML-module.

9. A computer program product, the computer program product comprising one or more non-transitory computer-readable storage media, and program instructions collectively stored on the one or more non-transitory computer-readable storage media, the program instructions comprising:
   receiving a plurality of data records from a plurality of networked entities, wherein each data record comprises a value corresponding to a first feature, a value corresponding to a second feature, and a target value;
   selecting either the first feature or the second feature as a selected feature;
   updating each data record with a generated further feature, wherein the further feature is calculated as either: a weighted ratio of the first feature to the second feature, or a logarithmic function of the first feature;
   calculating a first correlation metric as a measure of a correlation between the selected feature and the further feature;

training a machine learning module (ML-module) until a training error is below a training error threshold, wherein the training comprises repeatedly:
  inputting each updated data record as training data to the ML-module, resulting in a respective change of a value of each model parameter, a training error, and training output values, each training output value corresponding to each input further feature;
sorting the values of the generated further feature in ascending order, and dividing the sorted values of the generated further feature into a first subset dataset and a second subset dataset;
determining a bias metric indicating a strength of a bias of the ML-module toward the first subset dataset or the second subset dataset, based on the correlation metric being greater than a threshold; and
releasing the ML-module for usage if the bias metric satisfies a bias constraint, wherein the releasing comprises storing the model parameters and structural parameters of the ML-module, storing the correlation metrics, and bias metrics as meta data of the ML-module.

10. A computer system, the computer system comprising:
receiving a plurality of data records from a plurality of networked entities, wherein each data record comprises a value corresponding to a first feature, a value corresponding to a second feature, and a target value;
selecting either the first feature or the second feature as a selected feature;
updating each data record with a generated further feature, wherein the further feature is calculated as either: a weighted ratio of the first feature to the second feature, or a logarithmic function of the first feature;
calculating a first correlation metric as a measure of a correlation between the selected feature and the further feature;
training a machine learning module (ML-module) until a training error is below a training error threshold, wherein the training comprises repeatedly:
  inputting each updated data record as training data to the ML-module, resulting in a respective change of a value of each model parameter, a training error, and training output values, each training output value corresponding to each input further feature;
sorting the values of the generated further feature in ascending order, and dividing the sorted values of the generated further feature into a first subset dataset and a second subset dataset;
determining a bias metric indicating a strength of a bias of the ML-module toward the first subset dataset or the second subset dataset, based on the correlation metric being greater than a threshold; and
releasing the ML-module for usage if the bias metric satisfies a bias constraint, wherein the releasing comprises storing the model parameters and structural parameters of the ML-module, storing the correlation metrics, and bias metrics as meta data of the ML-module.

* * * * *